US006886656B2

(12) United States Patent
Fujioka et al.

(10) Patent No.: US 6,886,656 B2
(45) Date of Patent: May 3, 2005

(54) ELECTRIC POWER STEERING APPARATUS

(75) Inventors: Takehiko Fujioka, Kanagawa (JP);
Theerawat Limpibunterng, Tokyo (JP); Masahiko Kurishige, Tokyo (JP); Hideyuki Tanaka, Tokyo (JP); Hajime Oyama, Tokyo (JP)

(73) Assignees: Fuji Jukogyo Kabushiki Kaisha, Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/647,464

(22) Filed: Aug. 26, 2003

(65) Prior Publication Data
US 2004/0040781 A1 Mar. 4, 2004

(30) Foreign Application Priority Data
Aug. 27, 2002 (JP) ..................................... 2002-246282

(51) Int. Cl.[7] ................................................ B62D 5/04
(52) U.S. Cl. ...................................... 180/402; 180/446
(58) Field of Search ............................... 180/402, 443, 180/444, 446; 701/41, 42

(56) References Cited

U.S. PATENT DOCUMENTS

| 6,550,565 | B2 | * | 4/2003 | Thomas et al. | 180/402 |
| 2003/0141137 | A1 | * | 7/2003 | Menjak et al. | 180/402 |
| 2003/0209381 | A1 | * | 11/2003 | Menjak et al. | 180/402 |
| 2003/0230448 | A1 | * | 12/2003 | Guldner et al. | 180/402 |
| 2004/0011585 | A1 | * | 1/2004 | Menjak et al. | 180/402 |

FOREIGN PATENT DOCUMENTS

| JP | 11-101732 | 4/1999 |
| JP | 2000-128002 | 5/2000 |

OTHER PUBLICATIONS

Kenneth D. Norman, "Objective Evaluation of On-Center Handling Performance", Society of Automotive Engineers, Inc., 1985, pp. 1.380–1.392.

Keiyu Kin, et al., "Improvements in Vehicle Stability and Steerability with Slip Control", Honda R&D Technical Review, vol. 13 No. 1 Apr. 2001, pp. 91–98.

Kramer et al., "Potential Functions And Benefits Of Electronic Steering Apparatus", CSAT, Czech Republic, 1996, pp. 2678–2704.

* cited by examiner

*Primary Examiner*—Lesley D. Morris
*Assistant Examiner*—Tony Winner
(74) *Attorney, Agent, or Firm*—McGinn & Gibb, PLLC

(57) ABSTRACT

An electric power steering apparatus having a steering system capable of flexibly setting a relationship between a steering angle of a steering wheel and a wheel angle of a tire. The first motor controls steering reaction force exerted on the steering wheel. The on-center region determination section determines whether the steering wheel is in a position of an on-center region. The tire reaction force torque detection section detects tire reaction force torque transferred from the tire. The control section calculates a steering torque based on the tire reaction force torque and a torque gain. This torque is detected by the tire reaction force torque detection section. And the control section controls the first motor to exert the steering reaction force corresponding to the above calculated steering torque on the steering wheel. This control section also sets the torque gain in case of determining of on-center region larger than that in case of determining of non-on-center region.

16 Claims, 7 Drawing Sheets

ELECTRIC POWER STEERING APPARATUS

BACKGROUND OF THE INVENTION

1. Field of the Invention

The present invention relates to an electric power steering apparatus having a steering system capable of flexibly setting a relationship between a steering angle of a steering wheel and a wheel angle of a tire.

2. Description of the Related Art

Conventionally, as is known in the related art, a steer-by-wire (SBW) system is the system in which a steering shaft as a drive shaft coupled to a steering wheel is mechanically separated from a driven mechanism setting a proceeding direction of tires independently. This system allows wider range of control options compared with a conventional steering system in which the steering wheel and the tires are coupled through a mechanical linkage. As an example, Japanese Unexamined Patent Application Publication No. 2000-128002 discloses a steer-by-wire control device in which a steering reaction force is determined based on the steering drive condition and the steering driven position. In the art disclosed in it, the steering reaction force acting on the steering shaft is determined by mainly using only a steering angle as the steering drive condition being input information.

However, in the above art, the steering reaction force is determined by considering only the condition in which the steering wheel is steered, and there is no consideration with respect to an appropriate value of the steering reaction force in a region of "on-center feeling", which is the basis of the drivability. Here, this "on-center feeling" is due to a torque which is exerted on the steering wheel in case of slightly turning a vehicle. In this on-center region, if the torque to assist the steering of the steering wheel is too large, the driver cannot feel the center of the steering wheel (that is, straightly driving condition). As a result, there happens the problem that drivability is decreased. On the other hand, in this region, if this assist torque is too small, the drivability of straightly driving is increased, but there happens another problem that the driver's burden to turn the vehicle is increased.

Further, on-center feeling relates to a ratio (angle gain) of the wheel angle of the tire against the steering angle of the steering wheel. When this angle gain is small, the directional change of the tire becomes insensitive against operation of the steering wheel. Thus, while it becomes easy for the driver to keep the vehicle in a direction of straight driving, there happens the above mentioned problem on the driver's burden, because to turn the vehicle requires the driver wider range steering of the steering wheel. On the other hand, when the angle gain is large, since the directional change of the tire is sensitive against the operation, this results in an inconvenience in reverse to that occurring when the angle gain is small.

SUMMARY OF THE INVENTION

It is object of present invention to improve steering feeling and steerability by adjusting a torque gain and an angle gain in the electric power steering apparatus.

A first invention provides an electric power steering apparatus having a steering system capable of flexibly setting a relationship between a steering angle of a steering wheel and a wheel angle of a tire. A first motor controls a steering reaction force exerted on the steering wheel. An on-center region determination section determines whether the steering wheel is in a position of an on-center region. A tire reaction force torque detection section detects a tire reaction force torque transferred from the tire. A control section calculates a steering torque based on the tire reaction force torque and a torque gain. This torque is detected by the tire reaction force torque detection section. And the control section controls the first motor to exert the steering reaction force corresponding to the above calculated steering torque on the steering wheel. This control section also sets the torque gain in case of determining that the steering wheel is in the position of the on-center region larger than the torque gain in case of determining that the steering wheel is not in the position of the on-center region.

A second invention provides an electric power steering apparatus having a steering system capable of flexibly setting a relationship between a steering angle of a steering wheel and a wheel angle of a tire. In order to improve an on-center feeling, this novel apparatus has a first motor, a second motor, a steering angle detection section, an on-center region determination section, a tire reaction force torque detection section and a control section. The first motor controls a steering reaction force exerted on the steering wheel. The second motor for controls the wheel angle of the tire. The steering angle detection section detects the steering angle of the steering wheel. The on-center region determination section determines whether the steering wheel is in a position of the on-center region. The tire reaction force torque detection section detects a tire reaction force torque which is transferred from the tire. The control section calculates a steering torque based on the tire reaction force torque and a torque gain. This torque is detected by the tire reaction force torque detection section. The control section controls the first motor to exert the steering reaction force corresponding to the calculated steering torque on the steering wheel. This section also calculates the wheel angle based on the steering angle detected by the steering angle detection section and an angle gain. And this controls the second motor so that the wheel angle of the tire corresponds to the calculated wheel angle. Further, the control section sets the torque gain in case of determining that the steering wheel is in the position of the on-center region larger than the torque gain in case of determining that the steering wheel is not in the position of the on-center region. And this section also sets the angle gain in case of determining that the steering wheel is in the position of the on-center region smaller than the angle gain in case of determining that the steering wheel is not in the position of the on-center region.

A third invention provides an electric power steering apparatus having a steering system capable of flexibly setting a relationship between a steering angle of a steering wheel and a wheel angle of a tire. In order to improve an ability of turning (swinging), this apparatus has a first motor, a second motor, a steering wheel angle detection section, an on-center region determination section, a tire reaction force torque detection section and a control section. The first motor controls a steering reaction force which is exerted on the steering wheel. The second motor controls the wheel angle of the tire. The steering wheel angle detection section detects the steering angle of the steering wheel. The on-center region determination section determines whether the steering wheel is in a position of an on-center region. The tire reaction force torque detection section detects a tire reaction force torque which is transferred from the tire. The control section calculates a steering torque based on the tire reaction force torque detected by the tire reaction force torque detection section and a torque gain. This section controls the first motor to exert the steering reaction force corresponding to the calculated steering torque on the steering wheel. The section also calculates the wheel angle based on the steering angle detected by the steering angle detection section and an angle gain. Then the section controls the second motor so that the wheel angle of the tire corresponds to the calculated wheel angle. Further, the control section sets the torque gain in case of determining that the steering wheel is in the position of the on-center region smaller than the torque gain in case of determining that the steering wheel is not in the position of the on-center region. And this control section also sets the angle gain in case of determining that the steering wheel is in the position of the on-center region larger than the angle gain in case of determining that the steering wheel is not in the position of the on-center region.

DESCRIPTION OF PREFERRED EMBODIMENTS (First Embodiment)

Figure 1:
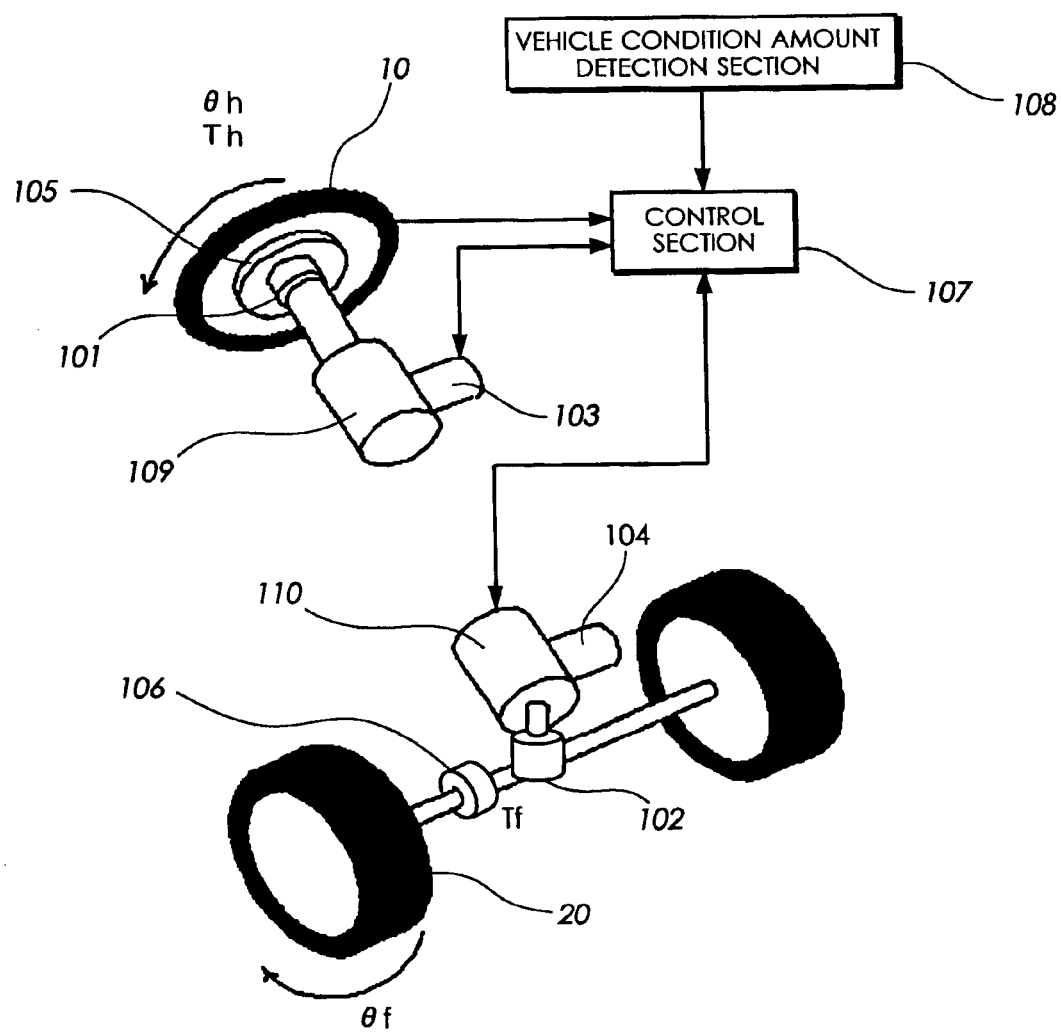
FIG. 1 is a diagram showing the entire structure of an electric power ste ring apparatus.

FIG. 1 is a diagram showing the entire structure of an electric power steering apparatus. This structure diagram shows a steer-by-wire system including a first motor 103 controlling a steering reaction force which is exerted on a steering wheel 10, and a second motor 104 controlling a wheel angle (actual set angle) of a tire 20. This system mainly includes two functions. The first is a function that the first motor 103 generates a control torque corresponding to a tire reaction force, which is transferred from the tire 20, and it exerts this control torque as a steering torque on the steering wheel 10. The second is a function that the second motor 104 generates a control torque corresponding to the steering angle of the steering wheel 10, and controls the wheel angle of the tire 20.

Figure 2:
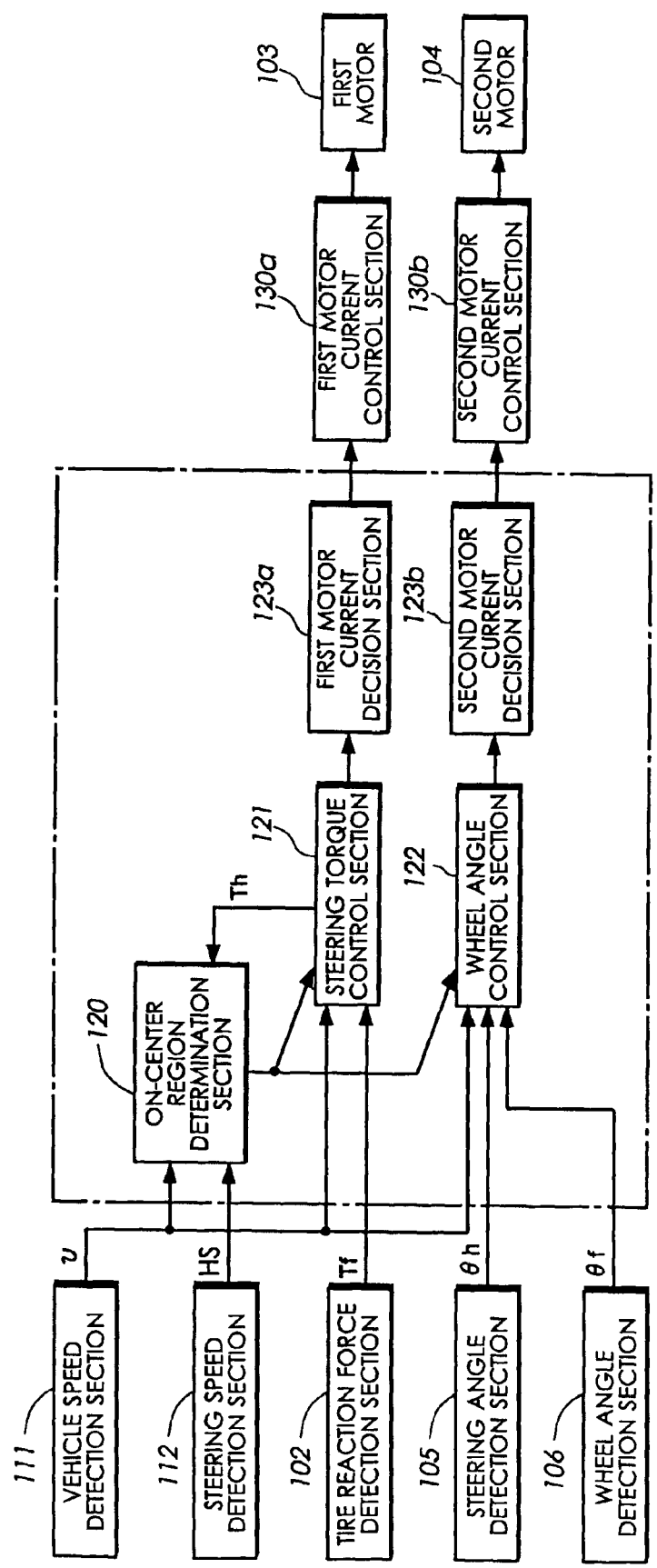
FIG. 2 is a control block diagram.

FIG. 2 is a control block diagram of the steer-by-wire system. Here, this figure shows a relationship between input and output blocks, which is discussed not only in first embodiment, but also in second embodiment or later, and thus, it should be noted that it is referred in every embodiment. A tire reaction force torque detection section 102 detects a tire reaction force torque Tf which is transferred from the tire 20. A steering angle detection section 105 detects a steering angle θh of the steering wheel 10, and a wheel angle detection section 106 detects a wheel angle θf of the tire 20. A vehicle speed detection section 111 detects a vehicle speed υ, and a steering speed detection section 112 detects a steering speed HS of the steering wheel 10, that is, the steering amount per a unit time. Further, as shown in FIG. 1 to improve steering feeling and driving stability, there provides a vehicle condition amount detection section 108. This detection section 108 detects various types of information indicating the driving condition of the vehicle (vehicle condition amount) such as a yaw rate, a lateral acceleration (acceleration of the vehicle in the lateral direction), a skid angle, or a road surface friction coefficient μ. Herein, it is not necessary that the vehicle condition amounts include all of them. A current flowing to the motors 103 and 104 and a voltage between motor terminals are detected for controlling the respective motors, these are not shown in this figure.

Herein, other than being directly detected by the tire reaction force detection section 102, the tire reaction force torque Tf may be estimated by using outputs such as a driving current or a rotation acceleration of the second motor 104 controlling the wheel angle (the same is applicable to the embodiments which are to be described later). Here, assuming that a torque constant of the motor 104 is Kt2, a current of the motor 104 is If, an inertia of the motor 104 is J2, and an acceleration of the motor 104 is dω2/dt, the tire reaction force torque Tf can be calculated by the following equation.

$$Tf = If \cdot Kt2 - J2 \cdot d\omega2/dt \qquad \text{[Equation 1]}$$

The control section 107 is a computer (steering control controller) mainly comprising CPU, ROM, RAM, an input/output interface, and the like. Here, other than a map for setting a torque gain α22 which will be described later, the ROM stores a stability determination map (described in fourth embodiment), upper and lower limit values of α22 and α11 (described in seventh embodiment), and the like. Interpreting functionally the control section 107, this section 107 includes an on-center region determination section 120, a steering torque control section 121, a wheel angle control section 122, and motor current decision sections 123a and 123b. The control section 107 performs an angle control of the tires and a torque control of the steering wheel in such a manner as to establish the following equation. Here, θh is a steering angle of the steering wheel 10, θf is a wheel angle of the tire 20, Tf is a tire reaction force torque, Th is a steering torque, α11 is an angle gain, and α22 is a torque gain.

$$\theta f = \alpha 11 \cdot \theta h$$

$$Th = \alpha 22 \cdot Tf \qquad \text{[Equation 2]}$$

The on-center region determination section 120 makes a determination about an "on-center region", which is important for performing the angle control and the torque control in the present embodiment. Here, the "on-center region" is a region in which the position of the steering wheel 10 is regarded as being close to neutral. In the present embodiment, the determination about the on-center region is made mainly by using information about the steering reaction force corresponding to the calculated steering torque. To be specific, turning to one direction (for example, turning-right) and turning to the other direction (for example, turning-left) of the steering wheel 10 are estimated based on the steering torque Th and the steering speed. It is determined as being on-center region, in case of ±2 Nm or lower (that is, |Th|=2 or |Th|<2) on turning to one direction, and in case of 0 Nm on turning to the other direction. However, it should be noted that the concrete value of the steering torque Th differs depending on which vehicle, and thus a threshold value (±2 Nm) providing a determination criterion for the on-center region is determined in consideration of the specifications of the vehicle. Surely, in a system including a sensor for detecting the steering torque, the above-described on-center region may be determined by using the steering torque detected by the sensor. In the embodiments described below, the to-be-used value of the steering torque may be either the calculated value or the detected value.

The wheel angle control section 122 calculates the wheel angle θf by multiplying the steering angle θh detected by the detection section 105 by the angle gain α11 (fixed value in the present embodiment). The second motor current decision section 123b decides a target value of the current for driving the second motor 104 in response to the wheel angle θf calculated by the control section 122, and it is output to the second motor current control section 130b. This allows such feedback control that the actual current of the second motor 104 equals to the target value, whereby the wheel angle of the tire 20 is controlled to be θf or so.

In the present embodiment, the angle gain α11 is a fixed value (constant value). The value of the angle gain α11 is a ratio between the steering angle θh and the wheel angle θf, and corresponds to reciprocal of the one called overall steering gear ratio. With respect to a general vehicle, the angle gain α11 is often set to be about $1/15$ to $1/20$. However, to realize the function of the steering system called a variable gear system, it may be set to be $1/10$ at low vehicle speed, and $1/30$ at high vehicle speed, for example.

On the other hand, the steering torque control section 121 calculates the steering torque Th by multiplying the tire reaction force torque Tf detected by the detection section 102 by the torque gain α22. The torque gain α22 is variable unlike the angle gain α11 described above. The first motor current decision section 123a decides a target value of the current for driving the first motor 103 in response to the steering torque Th calculated by the control section 121, and it is output to the first motor current control section 130a. This allows such feedback control that the actual current of the first motor 103 equals to the target value, whereby the first motor 103 exerts a predetermined torque derived by multiplying the current value by both the torque constant and the gear ratio (between the motor and the steering shaft). As a result, the steering torque at the time when the driver operates the steering wheel 10 is controlled to be Tf or so.

Figure 3:
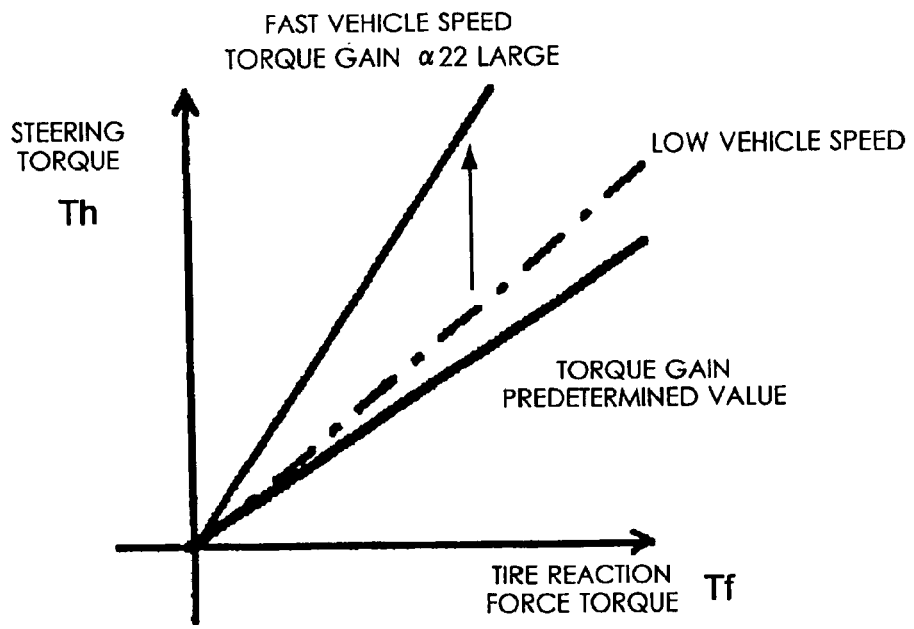
FIG. 3 is a diagram showing the relationship between a tire reaction force torque and a steering torque.

Here, as shown in FIG. 3, the torque gain α22 corresponding to the inclination of a straight line in a coordinate system of the tire reaction force torque Tf and the steering torque Th is set to be variable depending on the driving condition. In detail, when the determination section 120 determines that the steering wheel 10 is not in the position of on-center region, a torque gain predetermined value corresponding to the inclination of the thick actual line in the figure is used as the torque gain α22. On the other hand, when the steering wheel 10 is determined as positioning in the on-center region, used as the torque gain α22 is a value larger than the torque gain predetermined value. Moreover, in this case, the faster the vehicle speed v, the larger the value of the torque gain α22 will be. As an example, the torque gain predetermined value may be set to be a half of the torque gain of manual steering. This value is a torque gain value that indicates the ratio of the steering torque against the tire reaction force with respect to the general power steering system. This value is also the one introduced in the document authored by kenneth D. Norman (Object Evaluation of On-Center Handling Performance, SAE paper 840069, 1984). Further, by making this torque gain predetermined value equal to or larger than the torque gain with respect to manual steering, the tire reaction force larger than that of the manual steering is transferred to the driver. Accordingly, the on-center feeling of the steering wheel 10 can be further improved.

Figure 4:
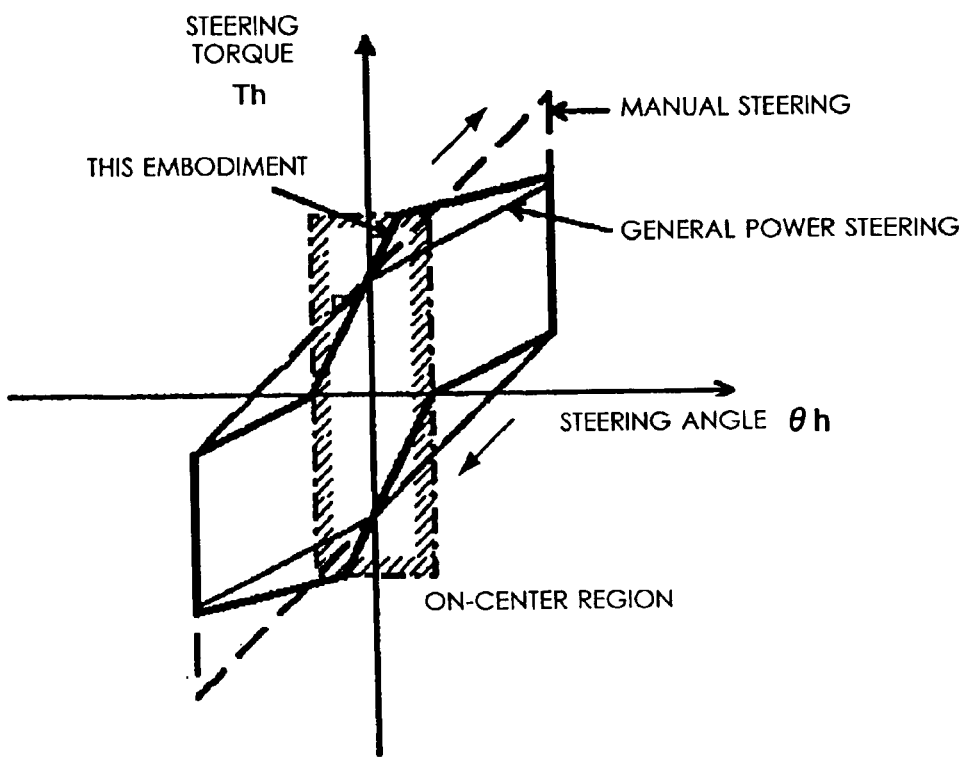
FIG. 4 is a diagram showing the relationship between a steering angle and a steering torque.

FIG. 4 is a diagram showing a relationship between the steering angle θh and the steering torque Th. As shown in this figure, in the present embodiment aiming for improvement of the on-center feeling, an inclination in the on-center region (hatched region) becomes larger compared with the characteristics of manual steering and the characteristics of general power steering. Therefore, according to the present embodiment, derived is the on-center feeling equal to or larger than manual steering, and the like.

As such, according to the present embodiment, the on-center feeling is increased, thereby enabling to improve operation feeling. Generally, to drive the vehicle in the on-center region, the steering torque Th of the steering wheel 10 being moderate amount will help the driver to drive with better steering feeling. As in the present embodiment, in the steering system capable of flexibly setting the relationship between the steering angle θh and the wheel angle θf, the steering torque Th to be transferred to the steering wheel 10 can be independently determined irrespective of the wheel angle θf. Utilizing such characteristics, when the steering wheel 10 is in the position of on-center region (i.e., close to the neutral position), the torque gain α22 is set larger than one when not in the region. As a result, th steering torque in the on-center region is increased by the increase of the torque gain α22, thereby enabling to improve the on-center feeling.

(Second Embodiment)

In the first embodiment described in the foregoing, the angle gain α11 is a fixed value. In the present embodiment, it is assumed to be avariable. Here, the entire system structure, and the basic parts relating to control over the wheel angle and the steering torque are similar to the first embodiment (especially FIGS. 1 and 2), and thus not described again (the same is applicable to the embodiments which will be described later).

Figure 5:
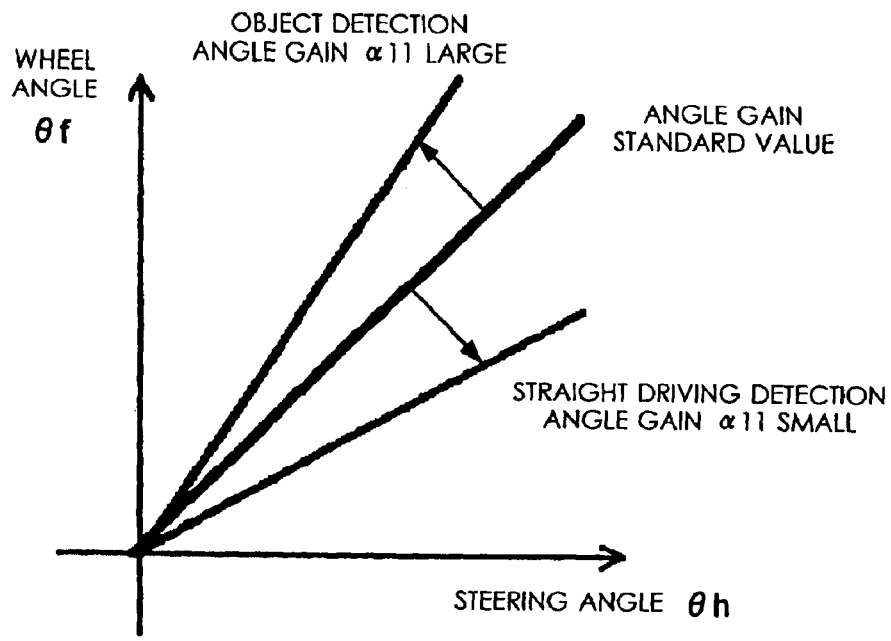
FIG. 5 is a diagram demonstrating a case where an angle gain of a second embodiment is a variable.

For example, when an obstacle object in front of the vehicle is detected by a monitor sensor such as a stereo camera, a laser radar, or an infrared radar, it may be necessary to avoid it urgently. In such an urgent avoidance, the wheel angle control section 122 sets the value of the angle gain α11 larger than a standard value, as shown in FIG. 5. As an example, in a case of a vehicle with the standard value of the angle gain α11 being $1/15$, the angle gain α11 is set to be $1/10$ at the time of detecting the object. In this manner, on detecting the object, the vehicle becomes easier to make a turn about 1.5 times than when driving normally. Accordingly, the steerability (ability to avoid objects) is improved. Further, on detecting the object, it is preferable for the steering torque control section 121 to also set the value of the torque gain α22 smaller than when driving normally. This makes the steering torque Th less as well, the steering wheel 10 can be operated more swiftly (improvement of swinging).

Moreover, in case of driving on expressways and the like, it is determined whether to continue to drive straightly by detecting process associated with a navigation system, as shown in FIG. 5, the wheel angle control section 122 may set a value of the angle gain α11 smaller than its standard value. By setting the angle gain α11 smaller when straight driving is expected for a while, the response of the vehicle becomes insensitive against the operation of the steering wheel 10. Accordingly, it is easy for driver to operate the steering wheel 10 in case of driving straightly. Similarly, at the time, the value of the torque gain $\alpha 22$ may be set larger. In such a manner, the steering torque Th becomes more, and the on-center feeling of the steering wheel 10 is validly transferred to the driver, thereby reducing a burden of steering.

As such, according to the present embodiment, by setting the angle gain $\alpha 11$ to be variable in response to the driving condition, the operability can be improved. Further, compared with the first embodiment in which the angle gain $\alpha 11$ is a fixed value, the vehicle behavior responding to the wheel steering can be flexibly set in response to the driving condition, or the driver's preferences. As a result, this improves the flexibility in terms of a setting of the wheel angle (actual wheel angle of tire).

(Third Embodiment)

In the above embodiments, determination about the on-center region is made based on the steering torque Th. In the present embodiment, determination is made based on the lateral acceleration. In detail, the on-center region determination section 120 determines that, if the lateral acceleration is a predetermined threshold value or smaller (e.g., ±0.1 G), then the steering wheel 10 positions in the on-center region. This threshold value is varied depending on which vehicle, and thus should be determined in consideration of the specification value of the vehicle. Detecting the lateral acceleration is enabled by employing an acceleration sensor on the vehicle. Alternatively, it is possible to derive through communication means such as CAN from other vehicle-mounting type system. In addition, other then the method carried out based on the lateral acceleration, the determination about the on-center region can be carried out based on the various vehicle condition amounts such as the tire reaction force and the steering angle. Note here that, these matters are applicable also to the embodiments described later.

(Fourth Embodiment)

In the present embodiment, using a stability determination map defining the relationship between the yaw rate and the skid angle of the vehicle, the driving stability of the vehicle is determined based on the distance between a coordinate point, which identifies from a skid angle and a yaw rate, and an origin. According to the determination result, the angle gain $\alpha 11$ and the torque gain $\alpha 22$ are changed. For this purpose, to the structure of the above embodiments, a yaw rate sensor and a skid angle sensor are newly added to detect the vehicle condition amount such as the yaw rate and the skid angle. To improve the driving stability of the vehicle, the control section 107 changes the angle gain $\alpha 11$ and the torque gain $\alpha 22$ to be variable in response to the vehicle condition amount. Here, the condition amount may be captured from other vehicle-mounting type system through CAN.

Figure 6:
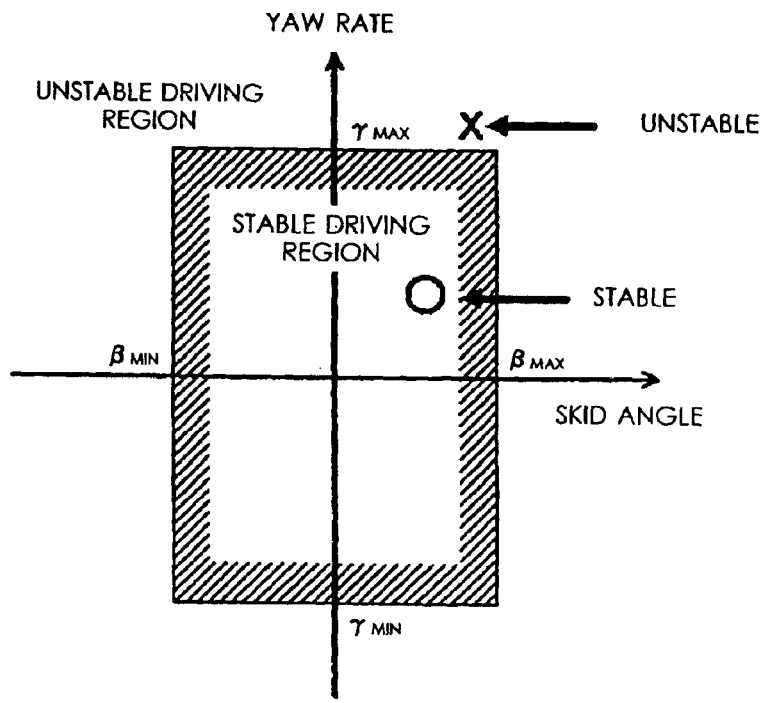
FIG. 6 is a diagram demonstrating a stability determination map in a fourth embodiment.

FIG. 6 is a diagram for demonstrating the stability determination map in the present embodiment. The method for determining the vehicle driving stability is introduced in the document authored by Kin, et al., "Improvement of vehicle's stability and steerability by skid control" (Honda R&D Technical Review, Vol. 13 No1 2001). In the present embodiment, for example, stability determination may be made with $\beta$ max being 5 deg, and $\gamma$ max being 30 deg/sec. In this figure, the distance between the coordinate point (skid angle, yaw rate) and the origin indicates the vehicle stability. When the coordinate point is located in the hatched region, it is determined as being stable driving, and when located outside the region, it is determined as being unstable driving.

On determining as being stable driving, as a normal driving mode, based on the above-described embodiments, the angle gain $\alpha 11$ and the torque gain $\alpha 22$ are set to be normal values. These normal values are set based on the above-described embodiments. On the other hand, on determining as being unstable driving, the torque gain $\alpha 22$ is set larger than its normal value. In this manner, the tire reaction force is transferred larger to the driver, and thus the driver can correctly sense the road condition from the steering wheel 10. Similarly, on determining as unstable driving, the angle gain $\alpha 11$ is set smaller than its normal value. In this manner, the vehicle behavior with respect to the wheel steering becomes insensitive. Steering the wheel in the region where vehicle driving is not stable is difficult for the general drivers. Erroneous driving operation may make the vehicle unstable. Thus, when the vehicle is not stable, the angle gain $\alpha 11$ is made smaller to prevent the driver's erroneous driving operation, and the torque gain $\alpha 22$ is made larger to provide road surface information needed for stabilizing the vehicle to the driver.

As such, according to the present embodiment, when the vehicle driving condition becomes unstable, the vehicle behavior becomes insensitive, and the steering torque becomes sensitive. Accordingly, the vehicle stability can be successfully increased.

Additionally, in the present embodiment, the stability is determined in binary (stable driving, unstable driving), and the gains $\alpha 11$ and $\alpha 22$ are set in binary. However, the gains $\alpha 11$ and $\alpha 22$ may be consecutively set. For example, in the above-described stability determination map, the distance between the coordinate point which is identified by both the skid angle and the yaw rate, and the origin is calculated, then the gains $\alpha 11$ and $\alpha 22$ are linearly changed in response to this calculated distance. In this case, as the distance becomes longer (as the driving stability becomes lower), the value of the angle gain $\alpha 11$ is consecutively decreased, and the value of the torque gain $\alpha 22$ is consecutively increased.

(Fifth Embodiment)

In the present embodiment, in order to improve the driving stability of the vehicle through estimation of the road surface friction condition, based on the estimation result, the angle gain $\alpha 11$ and the torque gain $\alpha 22$ are controlled to be variable. In detail, based on the lateral movement equation of the vehicle using adaptive control theory, the control section 107 calculates/estimates cornering power of the front and rear wheels of the vehicle. Then, the control section 107 calculates an estimation value of the road surface friction coefficient corresponding to the road surface condition in response to the cornering power of the front and rear wheels. Then, when this estimation value is a predetermined threshold value or larger (e.g., $\mu$=0.7), determination is made as a high $\mu$ road. When the value is smaller than that, determination is made as a low $\mu$ road. Here, such an estimation technique is described in detail in Japanese Unexamined Patent Application Publication No. 11-101732, and refer thereto if needed.

When the road surface is determined as being the high $\mu$ road, the angle gain $\alpha 11$ and the torque gain $\alpha 22$ are set to be normal in value. These normal values are based on the above-described embodiments. On the other hand, when the road surface is determined as being the low $\mu$ road, the angle gain $\alpha 11$ is set smaller than its normal value, and the torque gain $\alpha 22$ is set larger than its normal value. Therefore, even when condition of the road is slippery, it becomes able to ensure the stable driving of the vehicle.

Additionally, in the present embodiment, the condition of the road surface $\mu$ is determined in binary (stable driving, unstable driving), and the gains $\alpha 11$ and $\alpha 22$ are set in binary. However, these gains $\alpha 11$ and $\alpha 22$ may be consecutively set. In this case, as road surface $\mu$ becomes lower in condition (that is, as the road surface becomes slippery in condition), a value of the angle gain α11 is consecutively decreased, and a value of the torque gain α22 is consecutively increased.

(Sixth Embodiment)

Figure 7:
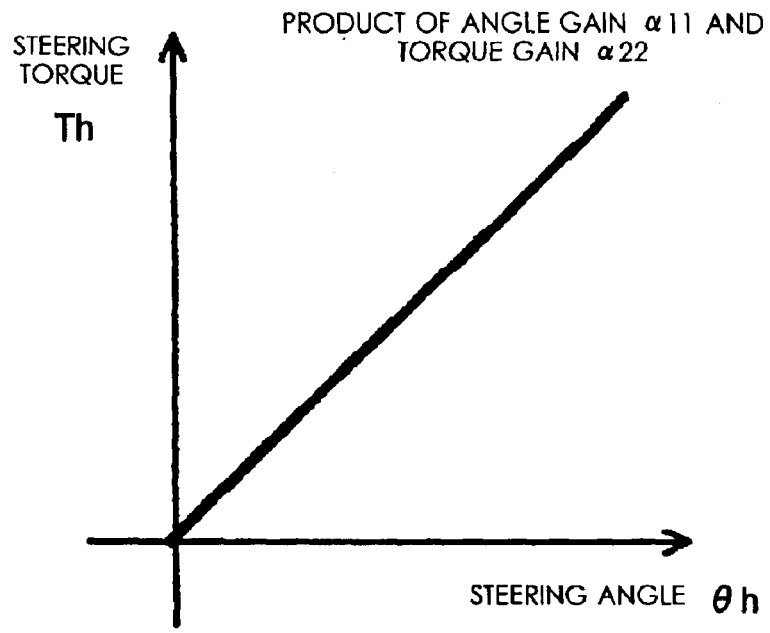
FIG. 7 is a diagram showing the relationship between a steering angle and a steering torque in a sixth embodiment.

FIG. 7 is a diagram showing the relationship between the steering angle θh and the steering torque Th in the present embodiment, and it shows a method for determining the torque gain α22 with the angle gain α11 made smaller. In the above embodiments, as shown in the above equation 2, the angle gain α11 and the torque gain α22 are each independently calculated. In the present embodiment, on the other hand, these are calculated while interrelated to each other in accordance with the following equation. Herein, K is an arbitrary constant.

$$\theta f = \alpha 11 \cdot \theta h$$

$$Th = \alpha 22 \cdot Tf$$

$$Tf = K \cdot \theta f$$

$$Th/\theta h = K \cdot \alpha 11 \cdot \alpha 22 \qquad \text{[Equation 3]}$$

As described in the foregoing, with Th/θh being a constant value (K·α11·α22), α11·α22 becomes also a constant value. This means that the product of the angle gain α11 and the torque gain α22 is a constant value. By making Th/θh a constant value, determining the torque gain α22 uniquely determines the angle gain α11. As such, by making the product of the angle gain α11 and the torque gain α22 a constant value, the operation process can be decreased in load. Here, the technique according to the present embodiment is applicable to any of the above embodiments.

(Seventh Embodiment)

Figure 8:
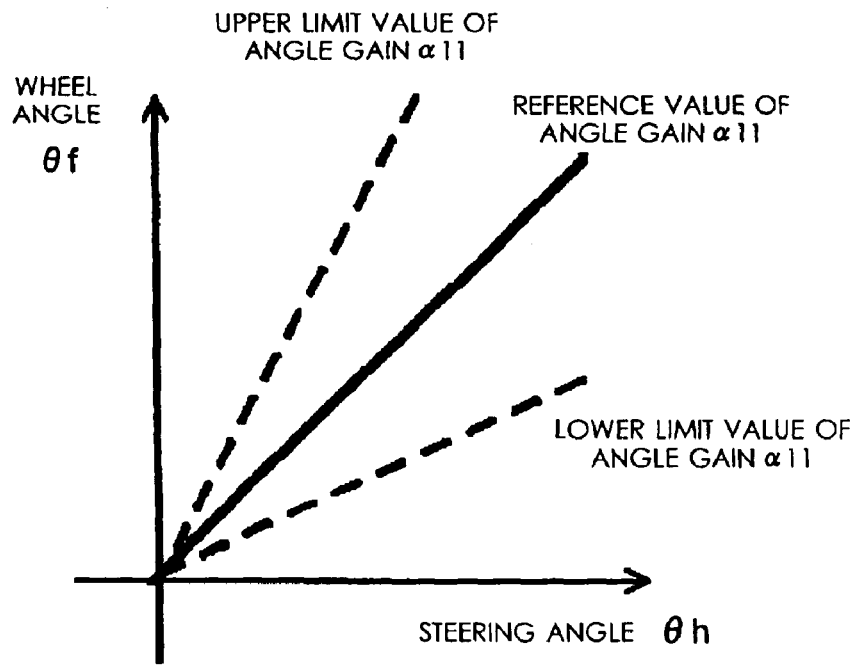
FIG. 8 is a diagram demonstrating upper and lower limit values of an angle gain in a seventh embodiment.

The present embodiment is characterized in providing the angle gain α11 and the torque gain α22 with an upper limit value and a lower limit value, respectively. FIG. 8 is a diagram demonstrating the upper and lower limit values of the angle gain α11. The reference value of the angle gain α11 is varied depending on which vehicle, and with respect to general vehicles, it may be about 1/15, for example. In this case, the upper limit value of the angle gain α11 is set as 1/3, for example. In the case of the angle gain α11 being 1/3, the angle gain will be 5 times of the reference value thereof being 1/15. Similarly, the lower limit value is set to be 1/75, for example. In the case of the angle gain α11 being 1/75, the angle gain will be 1/5 times of the reference value thereof being 1/15.

Figure 9:
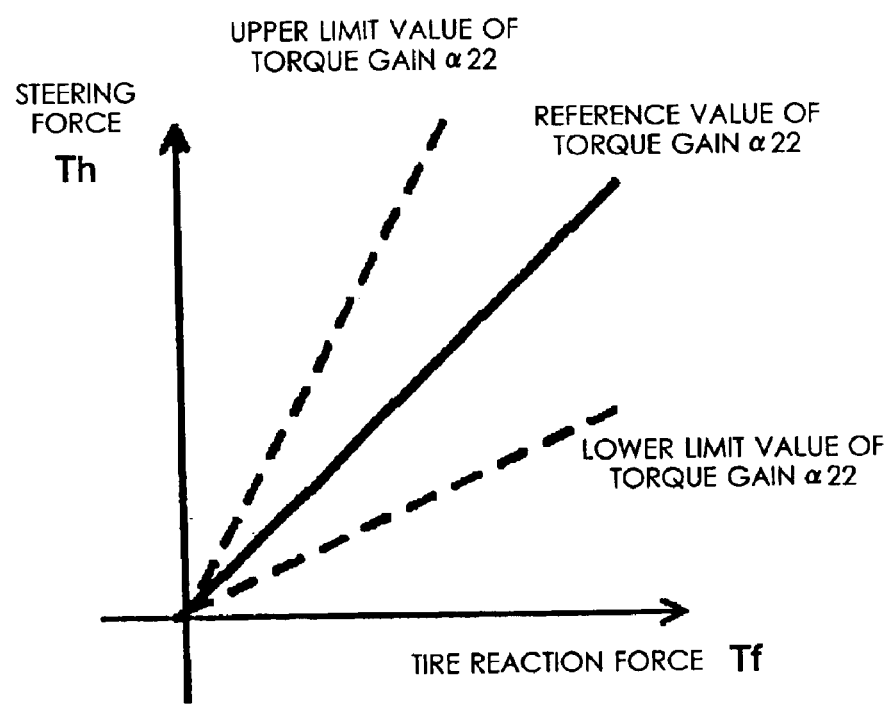
FIG. 9 is a diagram demonstrating upper and lower limit values of a torque gain in a seventh embodiment.

Further, FIG. 9 is a diagram demonstrating the upper and lower limit values of the torque gain α22. As the torque gain reference value, for example, used is 0.5 similarly to the first embodiment. Setting 2.5 to the upper limit value thereof and 0.1 to the lower limit value thereof will make the sensitivity of the steering torque 5 times and 1/5 times against the torque gain reference value, respectively.

In the present embodiment, the angle gain α11 and the torque gain α22 are each provided with the upper limit value and the lower limit value. In this manner, even if any erroneous signal input occurs due to a broken wire in the steering system, sensor failure, and the like, the driver can control the vehicle safely. Herein, the upper limit value and the lower limit value are not necessarily set to both of the angle gain α11 and the torque gain α22, and may be set either thereof.

Figure 10:
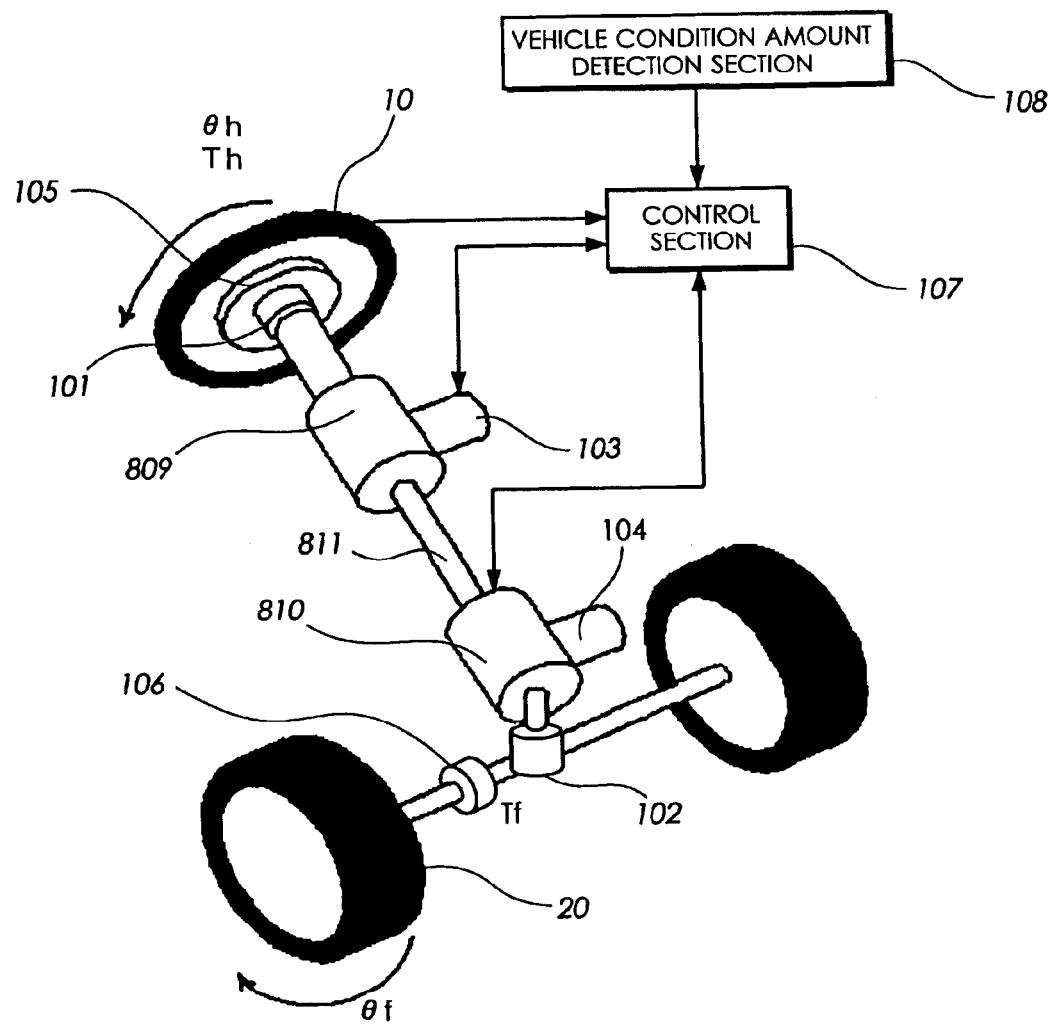
FIG. 10 is a diagram showing the entire structure of a wheel angle superimpose system.

Here, in the above embodiments, described is an example in which an electric power steering apparatus is applied to a steer-by-wire system. This is not restrictive, and the present invention can be widely applied to a system provided with a motor for controlling the steering reaction force and a motor for controlling the actual wheel angle of tire, including a wheel angle superimpose system shown in FIG. 10. The wheel angle superimpose system shown in the figure is different from the steer-by-wire system in a respect that the tire 20 and the steering wheel 10 are mechanically coupled to each other. In detail, a steering reaction force planetary gear 809 on the side of the steering wheel 10 and a wheel angle control planetary gear 810 on the side of the tire 20 are coupled to each other via a transfer shaft 811. Other components are similar to the structure of FIG. 1, and thus not described again by providing the same reference numerals as those shown in FIG. 1. Here, the steering angle superimpose system is described in detail in the document authored by Kramer ("Potential Function and Benefits of Electronic Steering Assistance", CSAT, Czech Republic, 1996).

According to the present invention, in an electric power steering apparatus including a steering system capable of flexibly setting the relationship between a steering angle of a steering wheel and a wheel angle of a tire, adjustment is applied to a torque gain and an angle gain depending on the steering angle of the steering wheel, the driving condition, and the like. In this manner, the steering feeling and the steerability can be improved.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An electric power steering apparatus having a steering system capable of flexibly setting a relationship between a steering angle of a steering wheel and a wheel angle of a tire, comprising:

a first motor for controlling a steering reaction force exerted on said steering wheel;

an on-center region determination section for determining whether said steering wheel is in a position of an on-center region;

a tire reaction force torque detection section for detecting tire reaction force torque transferred from said tire; and a control section for calculating steering torque based on said tire reaction force torque detected by said tire reaction force torque detection section and a torque gain, and for controlling said first motor to exert said steering reaction force corresponding to said calculated steering torque on said steering wheel, wherein said control section sets said torque gain in case of determining that said steering wheel is in the position of said on-center region larger than said torque gain in case of determining that said steering wheel is not in the position of said on-center region.

2. The electric power steering apparatus according to claim 1, further comprising:

a steering angle detection section for detecting said steering angle of said steering wheel; and a second motor for controlling said wheel angle of said tire, wherein said control section calculates said wheel angle based on said steering angle detected by said steering angle detection section and an angle gain as a fixed value, and controls said second motor so that said wheel angle of said tire corresponds said calculated wheel angle.

3. An electric power steering apparatus having a steering system capable of flexibly setting a relationship between a steering angle of a steering wheel and a wheel angle of a tire, comprising:

a first motor for controlling steering reaction force exerted on said steering wheel;

a second motor for controlling said wheel angle of said tire;

a steering angle detection section for detecting said steering angle of said steering wheel;

an on-center region determination section for determining whether said steering wheel is in a position of an on-center region;

a tire reaction force torque detection section for detecting tire reaction force torque transferred from said tire; and a control section for calculating a steering torque based on said tire reaction force torque detected by said tire reaction force torque detection section and a torque gain, for controlling said first motor to exert said steering reaction force corresponding to said calculated steering torque on said steering wheel, for calculating said wheel angle based on said steering angle detected by said steering angle detection section and an angle gain, and for controlling said second motor so that said wheel angle of said tire corresponds to said calculated wheel angle, wherein said control section sets said torque gain in case of determining that said steering wheel is in the position of said on-center region larger than said torque gain in case of determining that said steering wheel is not in the position of said on-center region, and sets said angle gain in case of determining that said steering wheel is in the position of said on-center region smaller than said angle gain in case of determining that said steering wheel is not in the position of said on-center region.

4. An electric power steering apparatus having a steering system capable of flexibly setting a relationship between a steering angle of a steering wheel and a wheel angle of a tire, comprising:

a first motor for controlling steering reaction force exerted on said steering wheel;

a second motor for controlling said wheel angle of said tire;

a steering wheel angle detection section for detecting said steering angle of said steering wheel;

an on-center region determination section for determining whether said steering wheel is in a position of an on-center region;

a tire reaction force torque detection section for detecting tire reaction force torque transferred from said tire; and a control section for calculating steering torque based on said tire reaction force torque detected by said tire reaction force torque detection section and a torque gain, controlling said first motor to exert said steering reaction force corresponding to said calculated steering torque on said steering wheel, for calculating said wheel angle based on said steering angle detected by said steering angle detection section and an angle gain, and controlling said second motor so that said wheel angle of said tire corresponds to said calculated wheel angle, wherein said control section sets said torque gain in case of determining that said steering wheel is in the position of said on-center region smaller than said torque gain in case of determining that said steering wheel is not in the position of said on-center region, and sets said angle gain in case of determining that said steering wheel is in the position of said on-center region larger than said angle gain in case of determining that said steering wheel is not in the position of said on-center region.

5. The electric power steering apparatus according to claim 1, wherein said on-center region determination section determines that said steering wheel is in the position of said on-center region, in case that an absolute value of said steering reaction force corresponding to said calculated steering torque is a predetermined threshold value or smaller.

6. The electric power steering apparatus according to claim 1, further comprising:

a steering torque detection section for detecting said steering torque of said steering wheel, wherein said on-center region determination section determines that said steering wheel is in the position of said on-center region, in case that an absolute value of said steering torque detected by said steering torque detection section is a predetermined threshold value or smaller.

7. The electric power steering apparatus according to claim 1, wherein said on-center region determination section determines whether said steering wheel is in the position of said on-center region, based on a lateral acceleration of a vehicle, said tire reaction force, or said steering angle.

8. The electric power steering apparatus according to claim 7, wherein said control section sets said angle gain or said torque gain in response to a vehicle condition amount indicating a driving condition of said vehicle.

9. The electric power steering apparatus according to claim 1, wherein said control section sets said angle gain or said torque gain in response to a vehicle condition amount indicating a driving condition of said vehicle.

10. The electric power steering apparatus according to claim 8, wherein said vehicle condition amount includes at least a vehicle speed.

11. The electric power steering apparatus according to claim 10, wherein said control section determines driving stability of said vehicle based on a distance on a stability determination map, and changes said angle gain and said torque gain in response to said determination result, said stability determination map defining a relationship between a yaw rate and a skid angle of said vehicle, said distance being obtained by connecting between a coordinate point and an origin on said stability determination map, said coordinate point being identified by the skid angle and the yaw rate.

12. The electric power steering apparatus according to claim 1, wherein said control section determines driving stability of said vehicle based on a distance on a stability determination map, and changes said angle gain and said torque gain in response to said determination result, said stability determination map defining a relationship between a yaw rate and a skid angle of said vehicle, said distance being obtained by connecting between a coordinate point and an origin on said stability determination map, said coordinate point being identified by the skid angle and the yaw rate.

13. The electric power steering apparatus according to claim 12, wherein said control section estimates a road surface friction condition, and changes said angle gain and said torque gain in response to said estimation result.

14. The electric power steering apparatus according to claim 1, wherein said control section estimates a road surface friction condition, and changes said angle gain and said torque gain in response to said estimation result.

15. The electric power steering apparatus according to claim 1, wherein said control section sets an upper limit value and a lower limit value with respect to at least either said angle gain or said torque gain.

16. The electric power steering apparatus according to claim 1, or wherein said control section sets an upper limit value and a lower limit value with respect to at least either said angle gain or said torque gain.

* * * * *